Sept. 24, 1963     H. G. O'HARE, JR     3,104,508
FACE FLY MASK FOR DAIRY COWS AND OTHER ANIMALS
Filed April 18, 1962
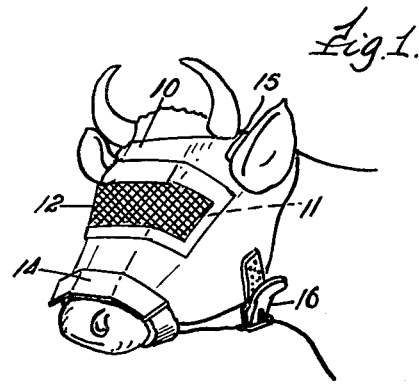
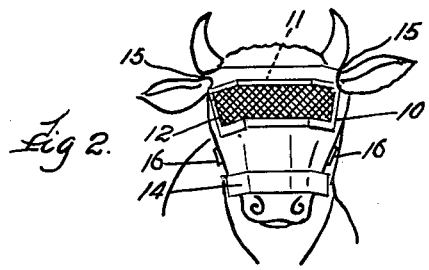
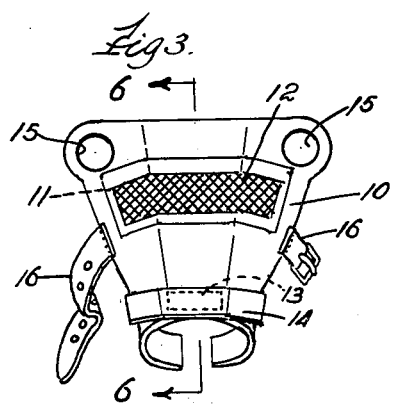
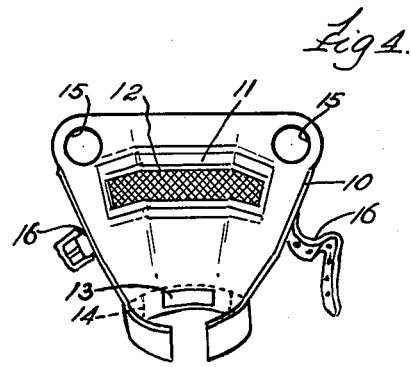
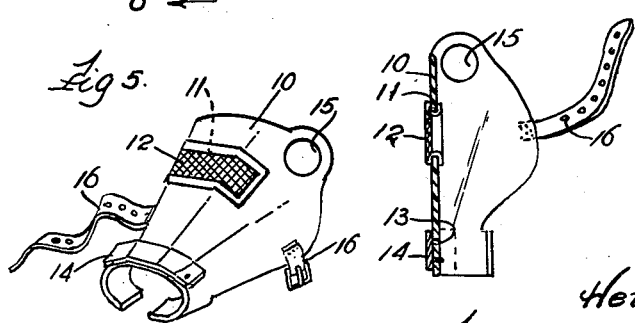
INVENTOR.
Henry George O'Hare, Jr.
BY
James R. McKnight
Attorney.

United States Patent Office 3,104,508
Patented Sept. 24, 1963

3,104,508
FACE FLY MASK FOR DAIRY COWS AND OTHER ANIMALS
Henry George O'Hare, Jr., R.R. 1, Amboy, Ill.
Filed Apr. 18, 1962, Ser. No. 188,315
1 Claim. (Cl. 54—81)

My invention relates to a mask adapted to be removably attached to a dairy cow or other animal to protect it from flies and other insects.

Flies and other insects often so irritate cows as to sicken them and reduce their milk supply and cause them to lose weight and suffer ill health or die. This mask is designed to prevent these annoyances to cows and maintain their health and milk supply. The mask is much less expense than the loss of the milk or the cow.

Among the objects of my invention is to provide a mask which will protect a dairy cow, or other animal, from being bitten by flies or other insects. Another object is to provide a mask which will particularly protect a dairy cow or other animal from attack by flies at or adjacent the eyes, which parts are very tender and are most often attacked by flies and the like.

Another object is to provide a mask, simple and economical to construct, easy to put on and take off, and acceptable and pleasant for the cow or other animal to wear.

Still another object is to protect the farmer from loss of milk due to an injured cow.

My invention also comprises such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings,

FIG. 1 is a side elevational view of my mask in position on a cow.

FIG. 2 is a front elevational view of the same on reduced scale.

FIG. 3 is a front elevational view drawn on an enlarged scale.

FIG. 4 is a rear view drawn on an enlarged scale.

FIG. 5 is a perspective view.

FIG. 6 is a detailed sectional view on line 6—6 of FIG. 3.

The preferred embodiment selected to illustrate my invention comprises a mask 10 of hard plastic material shaped to fit over the head and face of a dairy cow or other animal. Said mask has a slot 11 cut away across the front adjacent the eyes and is covered by a fine screen 12 suitably attached to the mask. This screen being openwork permits the cow to see therethrough, but still protects the animal from flies or other insects. Another slot 13 cut away at the lower portion of the mask is fitted with an overlapping metal nose plate 14. On either side of the upper portion, mask 10 has openings 15 for the passage therethrough of the ears of the animal. A pair of straps 16 preferably of heavy canvas are attached to mask 10 on opposite sides, having openings and a buckle for interengagement and for removably holding the mask in place on the cow.

My mask is formed so that when it is in position on the cow, it may fit snugly and yet comfortably—snugly enough to stay in place and to prevent flies from coming in under the mask, and yet with sufficient room to be comfortable on the animal.

In use, my mask is economical, easy to put on and take off, is pleasant for the animal to wear, protects it from annoyance, loss of weight and infection, and insures placidity in a cow and continued production of milk. This is of great value and gain to the farmer who depends upon the cow for its uninterrupted production of milk.

Having thus described my invention, I claim:

A mask shaped to fit over, cover and protect the head and face of a dairy cow or other animal comprising a body member of hard plastic, said body member having a slot cut away across the front adjacent the eyes of the animal, a fine openwork screen fitted to said body member at and covering the slot, said body member having at its lower portion adjacent the nose of the animal another and smaller slot, a metal nose plate attached to said body member within the smaller slot and overlapping the smaller slot, said body member having in its upper portion a pair of spaced openings to permit passage therethrough of the ears of the animal, and strap means attached to opposite sides of said body member and adapted to interengage removably to hold the mask on the animal.

References Cited in the file of this patent
UNITED STATES PATENTS

| | | |
|---|---|---|
| 382,668 | Sullivan | May 8, 1888 |
| 481,152 | Steele | Aug. 16, 1892 |
| 2,407,029 | Miller | Sept. 3, 1946 |